United States Patent [19]

Yoshino

[11] 4,085,412
[45] Apr. 18, 1978

[54] DEVICE FOR RECORDING INFORMATION ON A FILM IN A PHOTOGRAPHIC CAMERA

[75] Inventor: Takeshi Yoshino, Omiya, Japan

[73] Assignee: Fuji Photo Optical Co., Ltd., Omiya, Japan

[21] Appl. No.: 654,757

[22] Filed: Feb. 3, 1976

[30] Foreign Application Priority Data

Feb. 4, 1975 Japan .............................. 50-16683[U]
Feb. 17, 1975 Japan .............................. 50-21674[U]
Aug. 20, 1975 Japan .............................. 50-100906

[51] Int. Cl.² .............................................. G03B 17/24
[52] U.S. Cl. .................................................... 354/106
[58] Field of Search .................................. 354/105–109

[56] References Cited

U.S. PATENT DOCUMENTS

| 3,590,703 | 7/1971 | Ono ....................................... 354/106 |
| 3,815,980 | 6/1974 | Roth .................................. 354/109 X |
| 3,889,281 | 6/1975 | Taguchi et al. ................. 354/105 X |
| 4,001,850 | 1/1977 | Fujita ............................... 354/106 X |

*Primary Examiner*—John Gonzales

*Attorney, Agent, or Firm*—Gerald J. Ferguson, Jr.; Joseph J. Baker

[57] ABSTRACT

In a camera body there are provided a light source, information carrying discs illuminated by the light source, and a half-mirror for dividing the light from the information carrying discs into a light beam directed to the viewfinder and a light beam directed to the film. In the optical path of the light beam directed to the film is provided a light shielding shutter blade to prevent the light from reaching the film when the information is not desired to be recorded on the film. The information carying discs are rotatably mounted in the camera body and carry various characters to be recorded on the film. The information carrying discs are manually operable from outside of the camera body by manually operable dials. The dials are protected from being accidentally moved by a cover. A switch operating pin is operated by the cover so that the light source is turned on when the cover is opened and the light source is momentarily turned on to record the information on the film upon release of the shutter mechanism in the camera when the cover is closed.

25 Claims, 7 Drawing Figures

DEVICE FOR RECORDING INFORMATION ON A FILM IN A PHOTOGRAPHIC CAMERA

BACKGROUND OF THE INVENTION

1. Field of the Invention

This invention relates to an information recording device for photographic cameras, and more particularly to a device for recording information such as the date of photography or exposure factors on a film loaded in a photographic camera when a picture is taken whereby and at the same enabling the photographer to view the information recorded on the film through a viewfinder or the like.

2. Description of the Prior Art

Various photographic cameras provided with a data recording means such as a date recording device have been known in the art. Most of the conventional devices for recording data on the film in the camera are only capable of recording the data on the film and are unable to indicate the data to the photographer at the time the data are recorded. In the practical use of photographic cameras, it is highly desirable that the information actually recorded on the film should be indicated to the photographer at the time of photographing e.g. through a viewfinder.

There are known some cameras provided with means for enabling the photographer to view the information to be recorded on the film through a viewfinder. However, cameras of this kind employ a complicated optical system including a number of reflection faces manufactured at a high cost. Further, cameras of this kind suffer from a defect that the film is apt to be exposed to light invading into the camera through the information recording optical system.

SUMMARY OF THE INVENTION

In view of the above described defects inherent in the conventional information recording device for a photographic camera, the primary object of the present invention is to provide a device of simple construction built in a camera body for recording information on a film in the camera.

Another object of the present invention is to provide a device for recording information on a film in the camera which shows the information to be recorded to the photographer through the viewfinder or the like before the information is recorded.

Still another object of the present invention is to provide a device for recording information on a film in the camera which prevents light from invading into the camera body therethrough.

Still another object of the present invention is to provide a device for recording information on a film in the camera in which an information setting means for manually setting the information to be recorded is prevented from being accidentally touched so that the information once set will not be accidentally changed.

The above objects are accomplished by providing in the camera body a light source, an information carrying means illuminated by the light source and a half-mirror for dividing the light from the information carrying means into a light beam directed to the viewfinder and a light beam directed to the film. In the optical path of the light beam directed to the film is provided a shutter means to prevent the light beam from impinging on the film when the information is not desired to be recorded on the film. Further, in the optical path of the light beam directed to the film there are provided a mirror and a lens to form an erect image of the information on the film. The information carrying means comprises at least one information disc carrying thereon characters arranged in a circle. When a date is to be recorded on the film, three discs carrying years, months and days of the month respectively are rotatably supported to set the date of photography thereby. The discs are made of opaque material and the characters are formed as transparent portions thereof. When a plurality of discs are used, the characters carried by different discs are positioned at different positions when viewed through the viewfinder and recorded on the film. Furthermore, the plurality of discs are arranged in superposition with each other to effectively provide the combination of different characters while occupying the least space in the camera possible.

The information recording device in accordance with the present invention is further provided with means for preventing accidental movement of the information carrying means set to indicate the information to be recorded. The information carrying means is associated with manual operating means exposed on the surface of the camera body to be manually operated to set the information. The manual operating means is covered with a protective cover which is moved between a closed position and an open position. When the cover is in the open position, the information is indicated in the viewfinder to be viewed by the photographer so that any accidental movement thereof can be noticed. When the cover is closed, i.e. when the manual operating means is protected from being accidentally moved, the information disappears from the viewfinder and the shutter means in the light beam directed to the film from the information carrying means is put into the state ready for recording the information on the film.

Since the device for recording information on the film in the camera in accordance with the present invention is simple in construction and completely built in the camera body, the all-over size of the camera can be made compact. Further, since a half-mirror is provided in the device to divide the light from the information carrying means into a light beam directed to the viewfinder and a light beam directed to the film, the information to be recorded on the film can be viewed through the viewfinder. Since a shutter means is provided in the optical path of the light beam directed to the film from the information carrying means and a light source is used to record the information on the film, there is no fear of accidental exposure of the film to the ambient light or unnecessary light. Further, since a light source is used for recording the information on the film, the information to be recorded can be clearly viewed through the finder and clearly recorded on the film even when a photograph of a dark scene is taken.

It will be noted that the indication of the information to be recorded need not necessarily be made through the viewfinder if another proper viewing means is provided on the camera.

DESCRIPTION OF THE PREFERRED EMBODIMENTS

Figure 1:
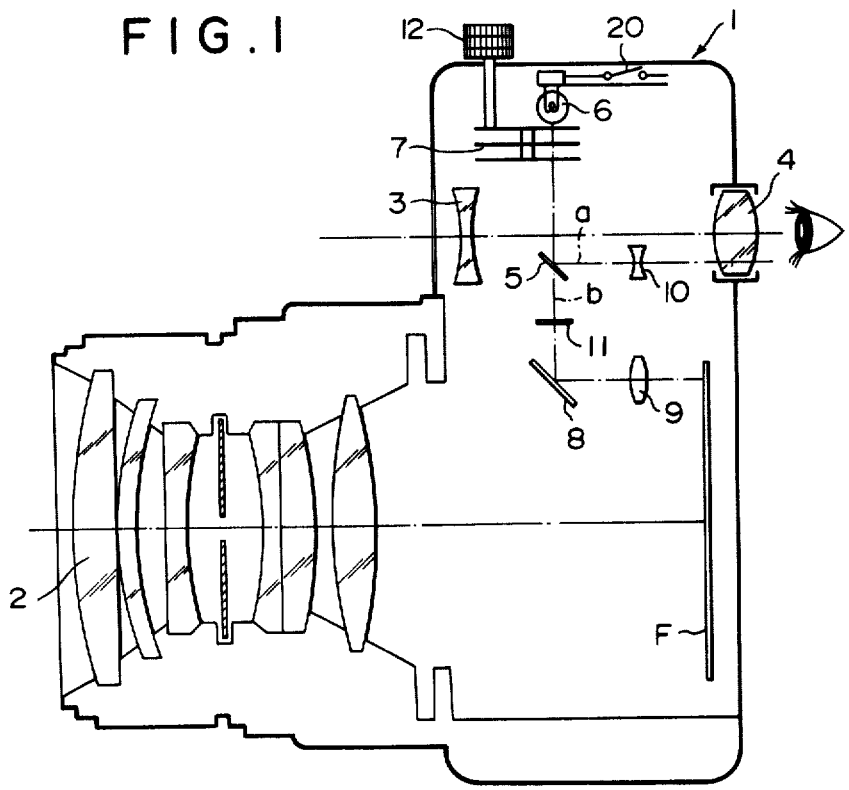
FIG. 1 is a schematic side sectional view showing the internal structure of the information recording device in accordance with an embodiment of the present invention.

A preferred embodiment of the present invention is illustrated in FIG. 1. In a camera body 1 having a taking lens 2 in the front center thereof and a viewfinder system consisting of an objective 3 and an eyepiece 4 in the upper portion thereof, there is provided an information recording device comprising a light source 6 located at a fixed position above the viewfinder system, an information carrying means 7 located below the light source 6 to pass the light from the light source 6 therethrough, a half-mirror 5 located below the information carrying means 7 to divide the light passing through the information carrying means 7 into two light beams one of which is directed to the eyepiece 4 and the other to a film F loaded in the camera body, a mirror 8 located below the half-mirror 5 in the optical path of the light beam directed to the film F to reflect the light passing through the half-mirror 5 to the film F, a focusing lens 9 located in the optical path of the light beam reflected by the mirror 8 to focus an image of the information carried by said information carrying means 7 on the film F, and a focus control lens 10 located in the light beam directed to the eyepiece 4 for controlling the focus of the image of the information viewed through the viewfinder system. The light from the information carrying means 7 is partly reflected by the half-mirror 5 toward the eyepiece 4 which light beam is designated by a and is partly transmitted through the half-mirror 5 toward the film F by way of the mirror 8 which light beam is designated by b. The half-mirror 5 is of small size with respect to the field of view of the viewfinder system. The light source 6 is turned on and off by means of a switch 20 which is closed by an external manual switch button or the like. The switch 20 may be closed upon the half depression of a shutter release button (not shown). A shutter means 11 such as a light intercepting member selectively put into the optical path of the light beam b directed to the film F is provided. Said information carrying means 7 is associated with a manual operating member 12 exposed on the surface of the camera body 1 so that the information carrying means 7 may be manually operated from outside of the camera body. The shutter means 11 is connected with a shutter release mechanism so that the shutter means 11 will be opened to record the information on the film when the shutter of the camera is released to expose the film. It will be understood that the position of the mirror 8 and the focusing lens 9 should be selected not to obstruct the light from the taking lens 2 to the film F.

The information recording device as described above employs only two mirrors 5 and 8 and two lenses 9 and 10 as an optical system. Therefore, the structure thereof is markedly simple and occupies little space within the camera body 1. Further, since the image of the information carrying means 7 is viewed through the viewfinder system 3 and 4, the photographer is able to know the information which will actually be recorded before the information is recorded on the film F.

Figure 2:
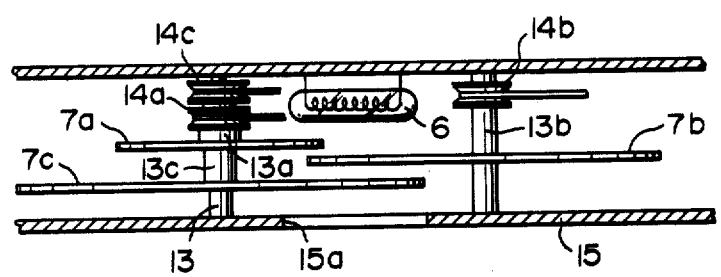
FIG. 2 is an enlarged side view showing the information carrying means comprising three discs for indicating the date of photography employed in another embodiment of the device of the present invention.
Figure 3:
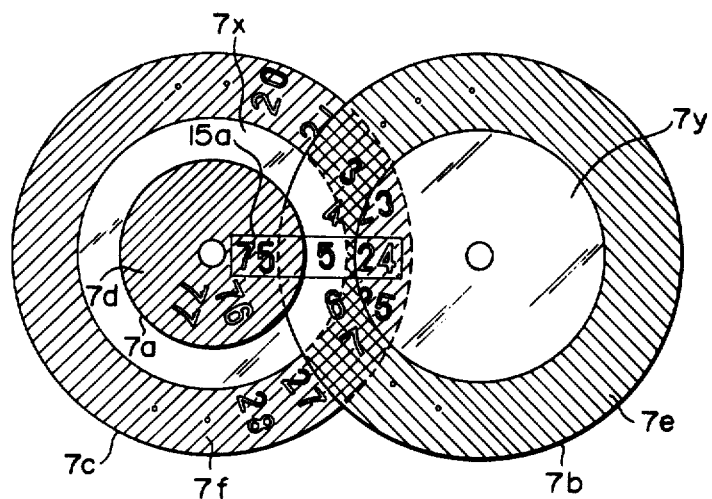
FIG. 3 is an enlarged front view showing the information carrying means as shown in FIG. 2.

The information carrying means 7 in accordance with a preferred embodiment thereof is shown in detail in FIGS. 2 and 3. This embodiment of the information carrying means 7 is designed for recording the date of photography and comprises three information carrying discs 7a, 7b and 7c rotatably provided in the camera body. The first disc 7a carries characters indicating years such as "75", "76" and "77", the second disc 7b carries characters indicating months "1" to "12" and the third disc 7c carries characters indicating days of the month "1" to "31". The first and third discs 7a and 7c are rotatably mounted to a common shaft 13. The first disc 7a is fixed to a sleeve 13a which is fixed to a first pulley 14a, the second disc 7b is fixed to a second sleeve 13b which is fixed to a second pulley 14b, and the third disc 7c is fixed to a third sleeve 13c which is fixed to a third pulley 14c. The pulleys 14a, 14b, 14c are connected with said manual operating member 12 to be selectively operated thereby. The three discs 7a, 7b, 7c are designed so that the characters are formed as transparent portions in opaque annular portions 7d, 7e, 7f as shown in FIG. 3, and the characters are arranged in a line in an aperture 15a provided in a frame 15 which covers the other unnecessary characters. In order to obtain as clear image as possible, the three discs 7a, 7b, 7c are desired to be made as thin as possible and the spacing between the discs should be made as small as possible. Although it is also possible to make the disc transparent and make the characters opaque, as an optical system is used to record the information, it is advantageous to employ opaque discs with transparent characters to obtain a clear image without noise on the film. The light source 6 should preferably be made in an elongated form as shown in FIG. 2. It will be noted that the discs 7b and 7c must respectively have transparent portions 7x and 7y in the above described embodiment to obtain a set of characters arranged in a line to give a date as shown in FIG. 3.

Figure 4:
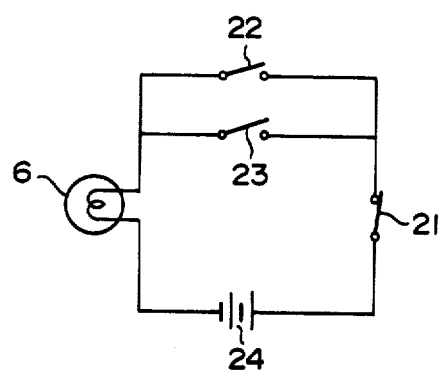
FIG. 4 is a circuit view showing an embodiment of a circuit for operating the information recording device in accordance with the present invention.

An example of a simple circuit for electrically controlling the light source 6 in the above embodiment is shown in FIG. 4. A main switch 21 and a parallel circuit of two auxiliary switches 22 and 23 are connected in series with the light source 6 across a power source 24. The main switch 21 is turned OFF only when the record of the information is not desired. One auxiliary switch 22 is normally opened, and turned ON when the information to be recorded is desired to be viewed through the viewfinder. The other auxiliary switch 23 is also normally opened, and is turned ON when the shutter mechanism is released to take a picture. The second auxiliary switch 23 to be closed when the shutter is released is preferably associated with the shutter mechanism in the camera so that the switch 23 is automatically closed upon release of the shutter. The main switch 21 and the first auxiliary switch 22 which are manually operated may be connected with a manual slide switch provided on the camera body or with a shutter release member so that the switches may be closed by manual operation.

It will be noted that the information carrying discs may be made to reflect the light from the light source instead of passing the light therethrough. In such a case, a reflector may be provided in front of the information carrying discs in addition to the half-mirror.

Figure 5:
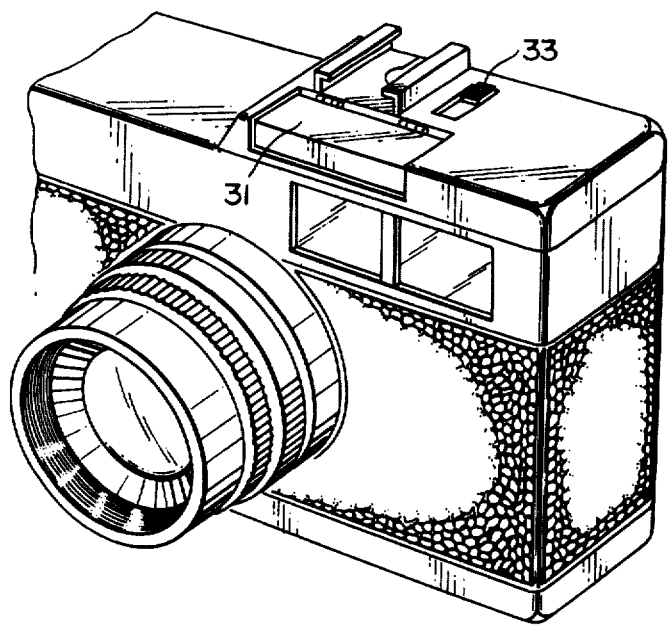
FIG. 5 is a partial perspective view showing an example of a camera provided with an embodiment of the device for recording information on the film in accordance with the present invention.
Figure 6:
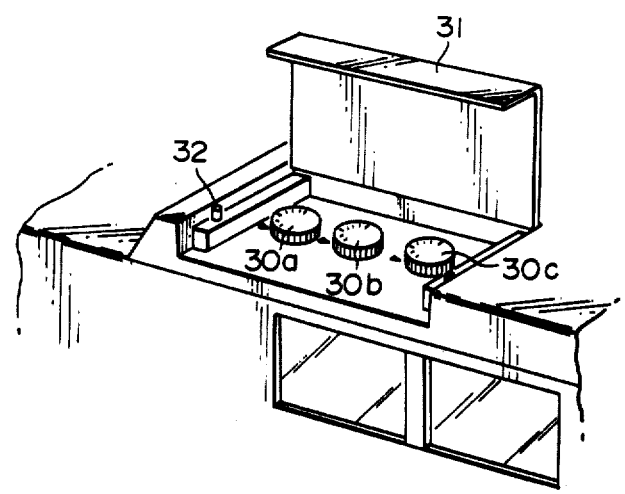
FIG. 6 is a fragmentary perspective view showing an example of the manual operating means for manually operating the information carrying means employed in an embodiment of the present invention.

Said manual switch 22 to be closed when the information to be recorded on the film is desired to be viewed through the viewfinder may be provided on the camera body so as to be closed upon operation of another manually operable member. One example of such a device is illustrated in FIGS. 5 and 6. The device shown in FIGS. 5 and 6 provides a protective cover 31 which covers manual operable dials 30a, 30b and 30c provided on the camera body for setting the information carrying means in the camera body. The manual operable dials 30a, 30b, 30c are, for instance, provided to set the three information carrying discs 7a, 7b, 7c, respectively, as employed in the foregoing embodiment of the invention. The protective cover 31 is movable between a closed position and an opened position as shown in FIG. 6. A switch operating pin 32 which is depressed by the cover 31 when the cover 31 is closed and moved upward to its upper position as shown in FIG. 6 when the cover 31 is opened is provided on the camera body. The switch operating pin 32 opens a switch corresponding to said manual switch 22 in the circuit of FIG. 4 when it is depressed, and closes the switch when it is moved upward. The pin 32 is spring-biased to be normally in the upper position and is depressed only when it is forced to move down, e.g. by the cover 31. Therefore, the switch corresponding to said switch 22 is closed to turn on the light source 6 only when the cover 31 is opened. In the embodiment shown in FIG. 5, there is also provided a switch 33 in the form of slide switch which is manually slid when the information recording device is used.

Said shutter means 11 shown in FIG. 1 may be a blade which is connected with a member operated by an electromagnetic coil. The electromagnetic coil may be in the form of an ammeter which drives a pointer having a shutter blade fixed thereto from one position to another when it is supplied with an electric current.

Figure 7:
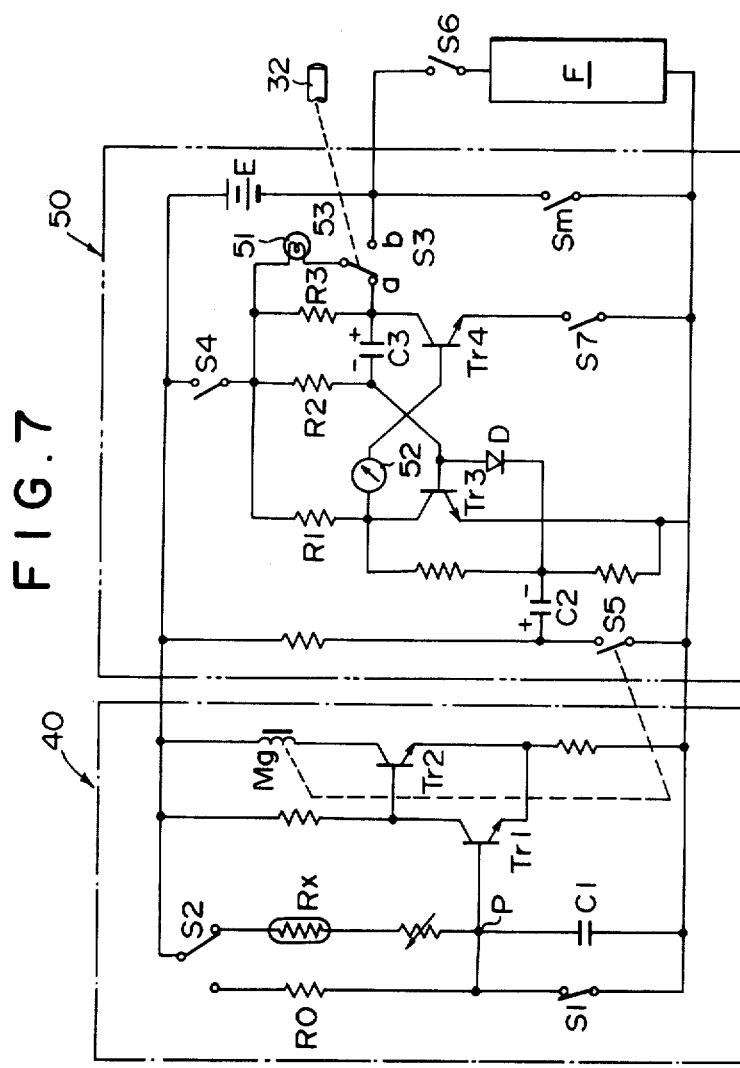
FIG. 7 is a circuit view showing another embodiment of the circuit for operating the information recording device in accordance with the present invention.

FIG. 7 shows an electric circuit when constitute an embodiment of an electric controlling means for controlling said light source 6, said shutter means 11 and an electric shutter speed controlling means. In this circuit, therefore, there is provided a lamp 51 serving as said light source 6 and an ammeter 52 serving as a drive means for driving said shutter means 11. A power source E and a main switch Sm connected therewith are connected with an exposure control circuit 40 which controls the shutter speed and an information recording device control circuit 50. The exposure control circuit 40 includes, as well known in the art, a photoreceptor Rx which receives light from the object to be photographed, a timing capacitor C1 connected therewith, a first transistor Tr1 connected with the connecting point P between the photoreceptor Rx and the timing capacitor C1 which together form a time constant circuit, a second transistor Tr2 connected with the first transistor Tr1 to be turned OFF when the first transistor Tr1 is turned ON upon the lapse of the time corresponding to the exposure time, and an electromagnet Mg connected with the second transistor Tr2 to be controlled thereby. The electromagnet Mg is associated with a means for closing the shutter to terminate the exposure of the film to the light coming through the taking lens of the camera when the second transistor Tr2 is turned OFF. Said timing capacitor C1 is connected in parallel with a switch S1 which normally short circuits the capacitor C1 and is opened upon the start of exposure. The photoreceptor Rx is connected in parallel with a fixed resistor R0 which is selectively connected with the power source E instead of the photoreceptor Rx when the shutter is released under the illumination of a strobo flash light by means of a change-over switch S2.

The information recording device control circuit 50 comprises portion for turning on the light source and a portion for momentarily turning on the light source. The portion for turning on the light source is actuated when the protective cover 31 is opened and the switch operating pin 32 is moved upward. In this circuit, the pin 23 is associated with a change-over switch S3 which is put into the first position to connect the lamp 51 with the power source E when a movable contact 53 is on the contact b side, and put into the second position on the contact a side to connect the lamp 51 with a monostable multivibrator. In the first position, i.e. the contact b side, the pin 32 is in the upper position with the cover 31 opened and the lamp 51 is turned on. In the second position, i.e. the contact a side, the pin 32 is in the lower position with the cover 31 closed and the lamp 51 is momentarily turned on to record the information on the film. The monostable multivibrator comprises three resistors R1, R2, R3, two transistors Tr3 and Tr4, two capacitors C2 and C3, and a diode D. In this monostable multivibrator, said ammeter 52 is connected between the collector of the transistor Tr3 and the base of the transistor Tr4, and said lamp 51 is connected with the collector of the transistor Tr4 by way of said change-over switch S3. Said light source turning on portion of the circuit 50 further comprises a switch S4 connected between the lamp 51 and the power source E on the other side of the lamp 51 with respect to said change-over switch S3. The switch S4 is, in one sense, a main switch which is manually turned on only when the information is desired to be recorded on the film. Therefore, the switch S4 may be made in a manually operable slide switch form as shown in FIG. 5 at 33. The control circuit 50 further includes a trigger switch S5 for triggering the portion for momentarily turning on the light source upon closure of the shutter mechanism (not shown). In this circuit, the trigger switch S5 is associated with the electromagnet Mg which is deenergized when the shutter mechanism is to be closed. A strobo flash light unit F connected with a synchronizing switch S6 is also connected with the control circuit 50 to be operated upon the release of the shutter mechanism. The emitter of the transistor Tr4 is connected with a switch S7 which is closed after the main switch Sm is closed upon depression of a shutter button (not shown) when the shutter release mechanism is operated so that the transistor Tr3 will be turned on before the trigger switch S5 is closed.

In operation of the above described circuit in accordance with the preferred embodiment of the present invention, the changeover switch S3 is first put on the contact b side by opening the protective cover 31 as shown in FIG. 6, and the switch S4 is closed by operating the slide switch 33. By this operation the lamp 51 is turned on and the information carried by the means 7 is viewed through the viewfinder. While viewing the through the viewfinder, the photographer manually rotates operating dials 30a, 30b and 30c to set a desired date or other information. At this moment, the ammeter 52 is not driven and accordingly the light beam b directed to the film F is shielded by the shutter means 11. Then, in order to record the set information on the film F in the camera, the protective cover 31 is closed to depress the switch operating pin 32 and put the changeover switch S3 into the contact a side and to protect the dials 30a, 30b, 30c from being accidentally moved.

Upon depression of a shutter release button (not shown), the main switch Sm and the switch S7 are sequentially closed. The exposure control circuit 40, on the other hand, operates to determine the exposure time as well known in the art and the electromagnet Mg is finally deenergized to close the shutter mechanism. Subsequent to the deenergization of the electromagnet Mg, the trigger switch S5 is closed and the transistor Tr3 is turned OFF since the base potential turns negative. By the turning OFF of the transistor Tr3, the base potential of the transistor Tr4 is raised to turn ON the transistor Tr4. Upon the turning ON of the transistor Tr4, the ammeter 52 is supplied with an electric current and operates to remove the light shielding shutter means 11 from the optical path of the light beam b directed to the film F. Simultaneously therewith, the lamp 51 is turned ON to record the information carried by the means 7 on the film F. The lamp 51 remains On until the capacitor C3 is discharged through the resistors R2 and R3 and the transistor Tr3 is turned ON. The period for which the lamp 51 is turned ON during the recording of the information on the film F is determined by the resistance of the resistor R2 and the capacity of the capacitor C3. The information which is being recorded on the film can be viewed through the viewfinder while the lamp 51 is turned ON.

When the information is not desired to be recorded on the film, the switch S4 is opened by sliding the slide switch 33 on the camera body.

I claim:

1. A device for recording information on part of a film loaded in a camera in addition to the image of an object to be photographed on the film comprising:
   a light source provided in the camera,
   information carrying means located in the camera at a position to receive the light from said light source, said information carrying means carrying thereon information to be recorded on a part of a film loaded in the camera,
   a viewfinder system provided in the camera including an eyepiece and an objective,
   a half-mirror disposed between said eyepiece and said objective to partly reflect the light from said information carrying means directly toward said eyepiece of the viewfinder to form a first light beam for viewing information and partly transmit therethrough the light from said information carrying means to form a second light beam for recording information,
   a mirror located in the optical path of the second light beam to reflect the light from the half-mirror toward a part of a film in the camera,
   a focusing optical element provided in the optical path of the second light beam for focusing an image of the information on the film,
   a first light intercepting shutter means provided in the camera to prevent the light from said image of the object to be photographed from reaching the film when recording of the object image is not desired; and
   a second light intercepting shutter means is provided in the second light beam to prevent the light from the half-mirror from reaching the film when the recording of the information is not desired.

2. A device as defined in claim 1 wherein said second shutter means is a shutter blade electrically driven to retract from the position to intercept the light in response to release of the first shutter means in the camera.

3. A device as defined in claim 1 wherein said information carrying means comprises at least one rotatable disc carrying thereon characters to be recorded on the film, one of the characters being selectively brought to a position to have the light from the light source received thereby carry the information of the character to said half-mirror.

4. A device as defined in claim 3 wherein said information carrying means comprises a plurality of rotatable discs each carrying thereon characters to be selectively recorded on the film in combination with the character of the other discs.

5. A device as defined in claim 4 wherein a light masking frame is provided between said information carrying means and said half-mirror to limit the area of the rotatable discs from which the light that carries the information it transmitted to said half-mirror.

6. A device as defined in claim 5 wherein the characters of the different discs to be recorded on the film in combination are positioned at different positions in the area limited by said masking frame.

7. A device as defined in claim 4 wherein said rotatable discs are three discs which carry characters indicating years, months and days of the month, respectively, to record the date of photography on the film.

8. A device as defined in claim 1 wherein said information carrying means is connected with a manual operating means provided on the camera to be manually controlled thereby.

9. A device as defined in claim 8 wherein said manual operating means is provided with a protective cover which is movable between a closed position to cover the manual operating means to protect the same from being accidentally moved and an opened position to allow access to the manual operating means.

10. A device for recording information on a part of a film loaded in a camera in addition to the image of an object to be photographed on the film comprising:
    a light source provided in the camera.
    information carrying means located in the camera at a position to receive the light from said light source, said information carrying means carrying thereon information to be recorded on a part of a film loaded in the camera and being connected with a manual operating means provided on the camera to be manually controlled thereby,
    a viewfinder provided in the camera including an eyepiece,
    a half-mirror located in said viewfinder to partly reflect the light from said information carrying means toward said eyepiece of the viewfinder to form a first light beam for viewing information and partly transmit therethrough the light from said information carrying means to form a second light beam for recording information,
    a mirror located in the optical path of the second light beam to reflect the light from the half-mirror toward a part of a film in the camera, a focusing optical element provided in the optical path of the second light beam for focusing an image of the information on the film, said manual operating means being provided with a protective cover which is movable between a closed position to cover the manual operating means to protect the same from being accidentally moved and an opened position to allow access to the manual operating means, and a switch for turning on said light source in the camera is provided in the vicinity of the manual operating means, said switch being normally opened and closed in response to the movement of the cover from said closed position to said opened position.

11. A device as defined in claim 10 wherein said switch is connected in series with said light source across an electric source, and another switch is connected in parallel with said switch, the latter switch being closed upon release of a shutter mechanism in the camera.

12. A device for recording information on a part of a film loaded in a camera in addition to the image of an object to be photographed on the film comprising:

a light source provided in the camera, information carrying means located in the camera at a position to receive the light from said light source, said information carrying means carrying thereon information to be recorded on a part of a film loaded in the camera, a viewfinder provided in the camera including an eyepiece, a half-mirror located in said viewfinder to partly reflect the light from said information carrying means toward said eyepiece of the viewfinder to form a first light beam for viewing information and partly transmit therethrough the light from said information carrying means to form a second light beam for recording information, a mirror located in the optical path of the second light beam to reflect the light from the half-mirror toward a part of a film in the camera, a focusing optical element provided in the optical path of the second light beam for focusing an image of the information on the film, a light intercepting shutter means provided in the second light beam to prevent the light from the half-mirror from reaching the film when the recording of the information is not desired, and a first circuit for turning on said light source for keeping the light source turned on to have the information to be recorded on the film viewed through the viewfinder, a second circuit for momentarily turning on said light source for recording the information on the film, an electric source for supplying an electric current to the light source, and a change-over switch connected between the electric source and said two circuits for making a change-over between said two circuits, said change-over switch being manually operated to switch the electric source from said first circuit to said second circuit, said shutter blade being driven to retract from the position to intercept the light only when the change-over switch is in the position to connect the electric source with said second circuit.

13. A device as defined in claim 12 wherein said change-over switch is provided on the camera so as to be manually operated.

14. A device as defined in claim 13 wherein said change-over switch is operated by a manually operable member movable between two positions on the camera.

15. A device as defined in claim 14 wherein said manually operable member is a cover movable between a closed position and an opened position, said information carrying means is connected with a manually operable member provided on the camera to be manually operated, and the latter manually operable member connected with the information carrying means is covered by said cover when the cover is in said closed position, whereby said change-over switch is switched from the position to connect the electric source with said first circuit to the position to connect the electric source with said second circuit in response to the movement of the cover from said opened position to said closed position.

16. A device for recording information on a part of a film loaded on a camera in addition to the image of an object to be photographed on the film comprising:

a light source provided in the camera, information carrying means located in the camera at a position to receive the light from said light source, said information carrying means carrying thereon information to be recorded on a part of the film in the camera, an optical system provided on the camera including a viewing window, a half-mirror located in the camera to partly reflect the light from the information carrying means toward said viewing window of the optical system to form a first light beam for viewing information and partly transmit therethrough the light from the information carrying means to form a second light beam for recording information, a mirror located in the optical path of the second light beam to reflect the light from the half-mirror toward a part of the film in the camera, a focusing optical element provided in the optical path of the second light beam for focusing an image on the information carried by said information carrying means on the film, an electric source provided in the camera, an electric control circuit connected between the electric source and said light source to control the energization of the light source, said electric control circuit comprises a first circuit for turning on a light source for keeping the light source turned on to have the information viewed through said optical system and a second circuit for momentarily turning on a light source to have the information recorded on the film, and said electric control circuit further includes a switching means connected with said first and second circuits for changing over the connection of the circuits with the electric source.

17. A device as defined in claim 16 wherein said second circuit is connected with an electric shutter speed control circuit provided in the camera.

18. A device as defined in claim 17 wherein said second circuit is started to momentarily turn on the light source when a signal generated from said shutter speed control circuit which signal indicates the end of the exposure time is transmitted to said second circuit.

19. A device as defined in claim 18 wherein said signal is given by an electromagnet provided in said shutter speed control circuit for closing the shutter mechanism in the camera.

20. A device as defined in claim 19 wherein said electromagnet is engaged with a trailing shutter curtain holding means of a focal plane shutter provided in the camera.

21. A device as defined in claim 16 further comprising a light beam intercepting means provided in the second light beam to prevent the light from the half-mirror from reaching the film when the recording of the information is not desired.

22. A device as defined in claim 21 wherein said light beam intercepting means is a blade movable between a first position to intercept the second light beam and a second position retracted from said first position.

23. A device as defined in claim 22 wherein said light beam intercepting blade is moved from said first position to said second position in response to release of a shutter mechanism in the camera.

24. A device as defined in claim 23 wherein an exposure control circuit for determining the shutter speed is provided in the camera, said exposure control circuit generating a signal which indicates the end of the exposure time, said light beam intercepting blade is moved from said first position to said second position when said signal is transmitted thereto from said exposure control circuit.

25. A device as defined in claim 22 wherein said electric control circuit comprises a first circuit for turning on a light source for keeping the light source turned on to have the information viewed through said optical system and a second circuit for momentarily turning on a light source to have the information recorded on the film, said light beam intercepting blade being connected with said second circuit to be moved from said first position to said second position while said second circuit momentarily turns on the light source.

* * * * *